United States Patent
Huang et al.

(10) Patent No.: US 10,409,507 B1
(45) Date of Patent: Sep. 10, 2019

(54) METHODS AND APPARATUS FOR IMPLEMENTING VIRTUAL DYNAMIC LIBRARY LOADING IN EMBEDDED SYSTEMS

(71) Applicant: Marvell International Ltd., Hamilton (BM)

(72) Inventors: Zhengqiang Huang, Dublin, CA (US); Shuangqing Yuan, Fremont, CA (US); Tao Song, Shanghai (CN); James Jan, San Jose, CA (US); Xinyu Zang, Palo Alto, CA (US); Yun-Chang Chang, Hsinchu (TW); Albert Xi Cheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 114 days.

(21) Appl. No.: 15/797,489

(22) Filed: Oct. 30, 2017

Related U.S. Application Data

(60) Provisional application No. 62/415,200, filed on Oct. 31, 2016.

(51) Int. Cl.
| | |
|---|---|
| *G06F 9/00* | (2006.01) |
| *G06F 3/06* | (2006.01) |
| *G06F 9/445* | (2018.01) |
| *G06F 12/10* | (2016.01) |
| *G06F 13/42* | (2006.01) |

(52) U.S. Cl.
CPC .......... *G06F 3/0626* (2013.01); *G06F 3/0607* (2013.01); *G06F 3/0631* (2013.01); *G06F 3/0655* (2013.01); *G06F 3/0679* (2013.01); *G06F 9/44521* (2013.01); *G06F 12/10* (2013.01); *G06F 13/4282* (2013.01); *G06F 2212/65* (2013.01); *G06F 2213/0026* (2013.01)

(58) Field of Classification Search
CPC .... G06F 21/572; G06F 9/4411; G06F 9/4401; G06F 3/123; G06F 21/575; G06F 21/74; G06F 8/656; G06F 3/0626; G06F 3/0607; G06F 3/0631; G06F 3/0655; G06F 3/0679; G06F 9/44521; G06F 12/10; G06F 13/4282; G06F 2212/65; G06F 2213/0026
See application file for complete search history.

(56) References Cited

U.S. PATENT DOCUMENTS

| | | | |
|---|---|---|---|
| 9,547,497 B2 * | 1/2017 | Swanson | ............ G06F 15/7807 |
| 2016/0275290 A1 * | 9/2016 | Kotary | ................... G06F 21/74 |

* cited by examiner

*Primary Examiner* — Idriss N Alrobaye
*Assistant Examiner* — Richard B Franklin

(57) ABSTRACT

The present disclosure describes methods and apparatuses for implementing virtual dynamic library loading in embedded systems. In some aspects, a determination is made that a feature is not available in firmware executed from a first memory. Based on information associated with the feature, a portion of a second memory is allocated for code of the feature. In some cases, the portion of the second memory is allocated from a data buffer or part of a shared memory. The code of the feature is loaded to the allocated portion of the second memory and address aliasing logic is configured enable execution of the feature from the second memory. By allocating and executing firmware features from the second memory, a size of the firmware executed from the first memory can be reduced to conserve memory space and other firmware features may be dynamically loaded and executed from the second memory.

20 Claims, 11 Drawing Sheets

METHODS AND APPARATUS FOR IMPLEMENTING VIRTUAL DYNAMIC LIBRARY LOADING IN EMBEDDED SYSTEMS

RELATED APPLICATIONS

This present disclosure claims priority to U.S. Provisional Patent Application Ser. No. 62/415,200 filed Oct. 31, 2016, the disclosure of which is incorporated by reference herein in its entirety.

BACKGROUND

Computing and electronic devices often include communication controllers to manage or implement various data communication functions. These communication controllers typically manage the communication of data at lower network layers, such as media layers where the data is structured and packetized for communication across a physical medium. To do so, most communication controllers include several memories that are each configured for a respective task to facilitate the communication of the data. For example, a communication controller may include dedicated or separate memories for receiving data, transmitting data, buffering data, encoding data, decoding data, and so on.

As communication data-rates increase, size requirements for these and other memories also increase to sustain data throughput and implement more-advanced functions for data processing. Die space and power budgets for communication controllers, however, often decrease with each iteration of controller design to reduce silicon costs and improve power efficiency. These iterative reductions in die space and power budget may limit silicon area and other resources of a communication controller that are typically required to support increases in memory size. As such, many communication controllers are implemented with memories that are insufficiently sized to maintain maximum data throughput, or with larger memories that require additional silicon area, consume more power, and increase cost of the communication controller.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method determines that a feature is not available in firmware executed by a processor from a first memory. Based on information associated with the feature, the method allocates a portion of a second memory for code of the feature. The code of the feature is then loaded from a third memory to the allocated portion of the second memory. The method also configures address aliasing logic to enable execution of the code of the feature from the second memory. To implement the feature, the processor executes the code of the feature from the second memory. By allocating and executing firmware features from the second memory, a size of the firmware executed from the first memory can be reduced to conserve memory space and other firmware features may be dynamically loaded and executed from the second memory. This in turn may permit the embedded system to be implemented with first and/or second memories of decreased size, reducing silicon area and power consumed by the memories.

In other aspects, System-on-Chip (SoC) comprises a medium access control (MAC) unit of a communication interface, a host interface, and a processor. A first memory of the SoC is coupled to the processor and a second memory of the SoC is coupled between the MAC unit and address logic. An interconnect bus couples the processor, the address alias logic, and the host interface of the SoC. The SoC also includes a virtual dynamic library loading (VDLL) manager configured to determine when a feature is not available in firmware executed from the first memory by the processor. The VDLL manager is also configured to access, in the first memory, information associated with the feature and allocate, based on the information, a portion of the second memory for code of the feature. The code of the feature is loaded by the VDLL manager from the host interface to the allocated portion of the second memory. The VDLL manager then configures the address logic to enable execution of the code of the feature from the second memory and causes the processor to execute the code of the feature from the second memory to implement the feature.

In yet other aspects, an apparatus comprises a non-volatile memory storing firmware and a network interface controller. The network interface controller includes a MAC unit, a host interface, and a processor. A first memory of the network interface controller is coupled to the processor and a second memory of the controller is coupled between the MAC unit and address logic. An interconnect bus of the network interface controller couples the processor, the address logic, and the host interface. The network interface controller also includes a VDLL manager configured to determine when a feature is not available in firmware executed from the first memory by the processor. The VDLL manager can access information associated with the feature and allocate, based on the information, a portion of the second memory for code of the feature. The code of the feature is then loaded by the VDLL manager to the allocated portion of the second memory from the non-volatile memory of the apparatus via the host interface. The VDLL manager also configures the address logic to enable execution, by the processor, of the code of the feature from the second memory to implement the feature.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations for implementing virtual dynamic libraries in embedded systems are set forth in the accompanying figures and the detailed description below. In the figures, the left-most digit of a reference number identifies the figure in which the reference number first appears. The use of the same reference numbers in different instances in the description and the figures may indicate like elements.

DETAILED DESCRIPTION

Figure 1:
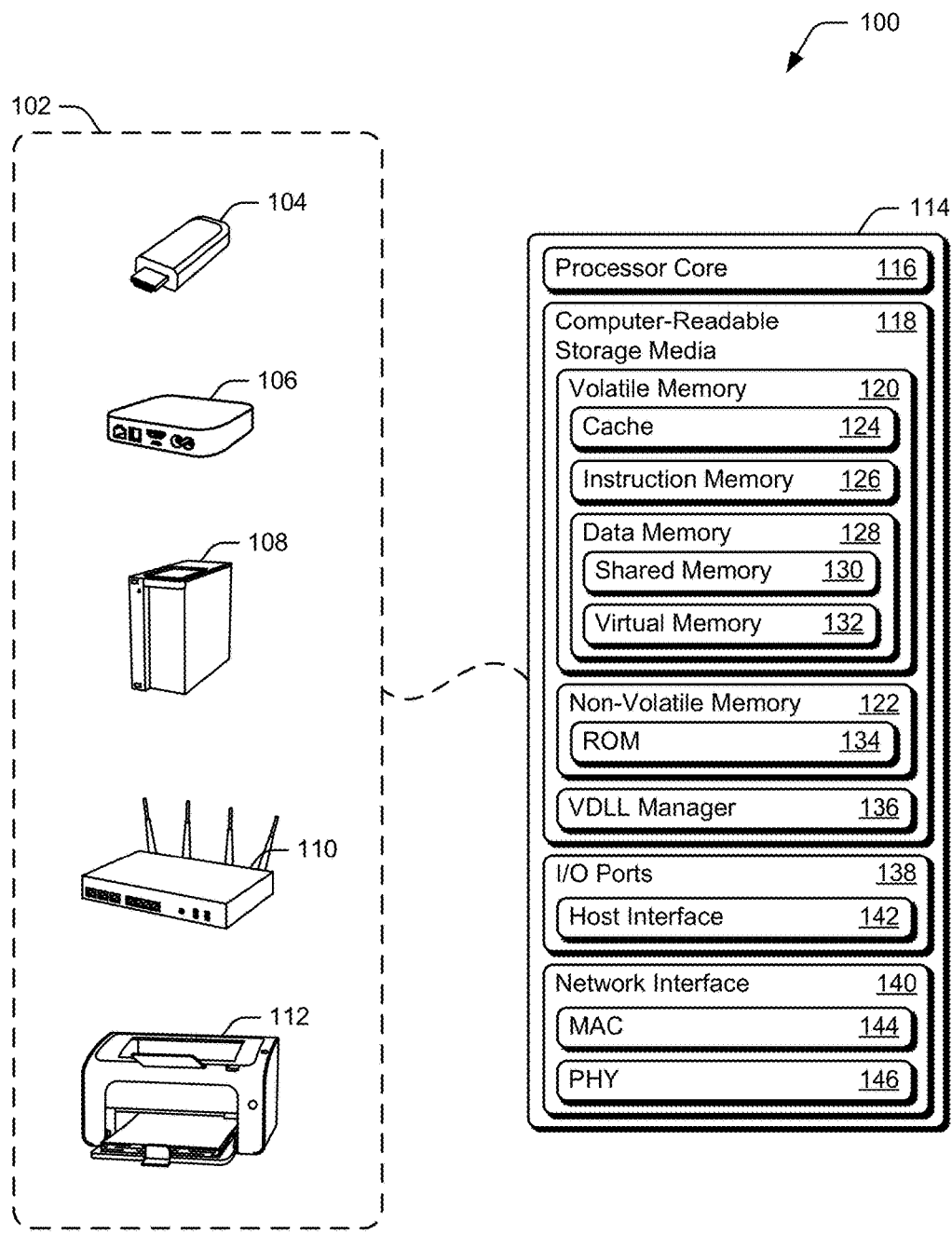
FIG. 1 illustrates an example operating environment having computing devices implemented in accordance with one or more aspects.

Computing and electronic devices often include embedded systems for implementing and managing data communication over various networks or with other devices. These embedded systems typically manage the communication of data at lower network layers, while providing a higher-level data interface for drivers or applications of a host device. To do so, an embedded system typically includes a processor and several memories that are each configured for a respective purpose, such as for storing firmware, storing instructions, caching data for the processor, or buffering data in a communication path. As communication data-rates and feature sets of the embedded system increase, minimum size requirements for the memories of the embedded system have also grown to ensure maximum data throughput and enable implementation of advanced firmware features.

In contrast with these performance aspects, system integrators often desire that embedded systems be implemented as smaller, lower cost components that consume less power. These constraints on die space and power budget typically limit silicon area and other resources of an embedded system that are necessary to support the aforementioned growth in memory sizes. As such, most embedded system designers are forced to choose between reducing feature sets and data throughput of an embedded system to meet cost and power requirements with low performance, or implementing a full-featured, maximum throughput embedded system that burdens a device with excessive cost and power consumption.

This disclosure describes techniques and apparatuses for implementing virtual dynamic library loading in embedded systems. In some aspects, a memory of an embedded system (e.g., system-on-chip) is shared between various functions of the embedded system. For example, the shared memory of an embedded system can be allocated between various data areas, communication buffers, and firmware code. To reduce memory size requirements of the embedded system, firmware of the system can be separated into a core firmware and a library of firmware features that can be dynamically loaded and executed from the shared memory. In some cases, the shared memory is also allocated from inactive communication buffers or other unutilized areas of the shared memory. By so doing, respective sizes of an instruction memory area from which the firmware is executed of the embedded system can be reduced without compromising performance or a feature set of the embedded system. In some cases, implementing an embedded system with a virtual dynamic library of firmware features enables a reduction in memory size by approximately 30%, which may also contribute to reduced power consumption and lower silicon cost.

By way of example, consider a system-on-chip that is implemented with a first memory from which firmware executes and a second memory configured as a shared memory for data buffers. In some aspects, a determination is made that when a feature (e.g., coexistence arbitration or channel scanning) is running the FW does not need all data buffers from the shared memory. Based on this information associated with the feature, a portion of the second memory can be allocated for code of the feature. In some cases, the portion of the second memory is allocated from the data buffer or another inactive area of a shared memory. The code of the feature is then loaded to the allocated portion of the second memory from a third memory (e.g., a read-only memory) or a host interface. Address aliasing logic is also configured to enable execution of the code of the feature from the second memory. By allocating portions of second memory, a size of the firmware executed from the first memory can be reduced and other firmware features may be dynamically loaded and executed from the second memory as requested. This may be effective to enable a full-featured, high throughput system-on-chip to be implemented with smaller memories, which in turn reduces silicon size, cost, and power consumption of the system-on-chip.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example of an operating environment 100 having computing devices 102, each of which is capable of communicating data, packets, and/or frames over a network or with another device. These exemplary computing devices 102 include a multimedia plug device 104, a set-top box 106, a network-attached storage (NAS) device 108, a wireless router 110, and a wireless printer 112. Although not shown, other configurations of the computing device 102 are also contemplated, such as a desktop computer, laptop computer, smart-phone, netbook, tablet computer, server, access point, camera, Internet-of-Things (IoT) device, smart appliance, wearable smart-device, content-streaming device, mobile-internet device (MID), mobile gaming console, and so on.

Generally, a computing device 102 can communicate data over a wired or wireless network, and/or with devices connected therewith. Alternately or additionally, the computing device 102 may provide other functionalities, such as media streaming, data storage, network administration, printing, imaging, or the like. For example, the set-top box may receive a stream of multimedia data via a wireless network and render the multimedia data into respective audio and visual data for output to a display device. In some cases, a computing device 102 may communicate with others of the computing devices 102 to provide network-based services or device-specific functionalities over a network.

To implement these or other functionalities, each of the computing devices 102 may include an embedded system 114 having one or more processor cores 116 and computer-readable storage media 118 (CRM 118). Although shown as a single processor core, the processor core 116 may be one of any suitable number and/or type of processing cores that are configured similarly or differently from each other. In some cases, the processor core 116 is implemented as a processor core of a microcontroller, system-on-chip, embedded controller, or digital-signal processor. For example, the processor core 116 may be implemented as a 32-bit reduced instruction set computer (RISC) core for executing a real-time operating system (RTOS). The CRM 118 of the embedded system may include any suitable type and/or combination of storage media, such as read-only memory (ROM), random access memory (RAM), static RAM (SRAM), dynamic RAM (DRAM), one-time programmable (OTP) memory, or Flash memory. The CRM 118 may store firmware, an operating system (e.g., real-time operating system (RTOS)), or applications of the embedded system 114 as instructions or code that is executed by the processor core 116 to implement various functionalities of the embedded system 114 or the computing device 102.

In this example, the CRM 118 of the embedded system 114 includes volatile memory 120 and non-volatile memory 122, which may be configured or partitioned into any suitable number of memory areas within the embedded system. The volatile memory 120 (e.g., RAM or SRAM) may include a cache memory 124, an instruction memory 126, and a data memory 128. The cache memory 124 may be associated with the processor core 116 and store code or data that is frequently or recently used by the processor core. In some cases, code or instructions of firmware (not shown) for the embedded system 114 is stored to the instruction memory for execution by the processor core 116.

The data memory 128 includes a shared memory 130 and virtual memory 132, which may be mapped to various portions or allocations of the shared memory 130. Generally, the shared memory 130 may be configured or partitioned to store and/or buffer data for various functions or components of the embedded system 114. Although shown as a separate memory, the virtual memory 132 may be implemented as virtually addressed portions of memory that are mapped to corresponding physical portions of the shared memory 130. The implementations and uses of the shared memory 130 and virtual memory 132 vary, and are described throughout the disclosure. The non-volatile memory 122 includes a ROM 134, which may be configured to store read-only (RO) code and data of firmware for the embedded system 114.

The CRM 118 also includes an instance of a virtual dynamic library loading manager 136 (VDLL manager 136), which may be configured to manage the shared memory 130 and virtual memory 132 of the embedded system 114. In some aspects, the VDLL manager 136 determines when a requested firmware feature is not available or provided by firmware of the embedded system 114 and dynamically loads code of the feature to the shared memory 130 for execution. By so doing, the code of the feature or other features can be dynamically loaded to the shared memory for execution as requested, allowing the embedded system 114 to be implemented with less overall memory. The implementations and uses of the VDLL manager 136 vary, and are described throughout the disclosure.

The embedded system 114 may also include I/O ports 138 and a network interface 140 for wired or wireless communication. The I/O ports 138 enable the embedded system 114 to interface with systems of the computing device 102, components within the computing device 102, components external to the embedded system, or the like. The I/O ports 138 may include any combination of internal or external ports, such as a universal serial bus (USB) port, Serial ATA (SATA) port, peripheral component interconnect express (PCIe) port, secure digital input/output (SDIO) interface, serial peripheral interface (SPI) bus, universal asynchronous receiver transmitter (UART) interface, and/or other legacy ports. In some aspects, the I/O ports 138 include a host interface 142 for communicating with or accessing resources of the computing device 102. For example, the host interface 142 may be configured as a USB interface, PCIe interface, or SDIO interface for communicating with a host driver executing on processor and memory resources (not shown) of the computing device 102.

The network interface 140 of the embedded system enables connectivity with one or more networks and other devices connected therewith. Although shown as a single network interface, the embedded system 114 may include or support multiple network interfaces for communicating data over multiple respective networks. The network interface 140 includes a media access control (MAC) layer unit 144 (MAC 144) for link layer functions and a physical layer component 146 (PHY 146) to implement physical layer function. In some cases, the MAC 144 and PHY 146 of the network interface are configured to implement a wired network interface, such as an Ethernet or fiber optic interface for communication over a local network, intranet, or the Internet.

Alternately, the MAC 144 and PHY 146 of the network interface 140 can be configured to implement a wireless network interface to facilitate communication over a wireless network or wireless communication link. When configured for wireless communication, the network interface 140 may operate in accordance with various Institute of Electronics and Electrical Engineers (IEEE) standards, such as IEEE 802.11-2016, IEEE 802.11ac, IEEE 802.11ax, IEEE 802.15 (e.g., BlueTooth™ or ZigBee), IEEE 802.16 (e.g., Wi-Max), or the like. As such, the network interface 140 is capable of communicating over a wireless personal area network (WPAN), wireless local area network (WLAN), peer-to-peer network, mesh network, cellular network, such as a 3rd Generation Partnership Project Long-Term Evolution (3GPP LTE) network. In some aspects, the embedded system 114 may be configured to implement multiple wireless networking protocols, such as a combination of 802.11 WLAN and BlueTooth™. Although not shown, the network interface 140 may also be associated with a receiver, transmitter, or transceiver to facilitate wired or wireless data communication.

Figure 2:
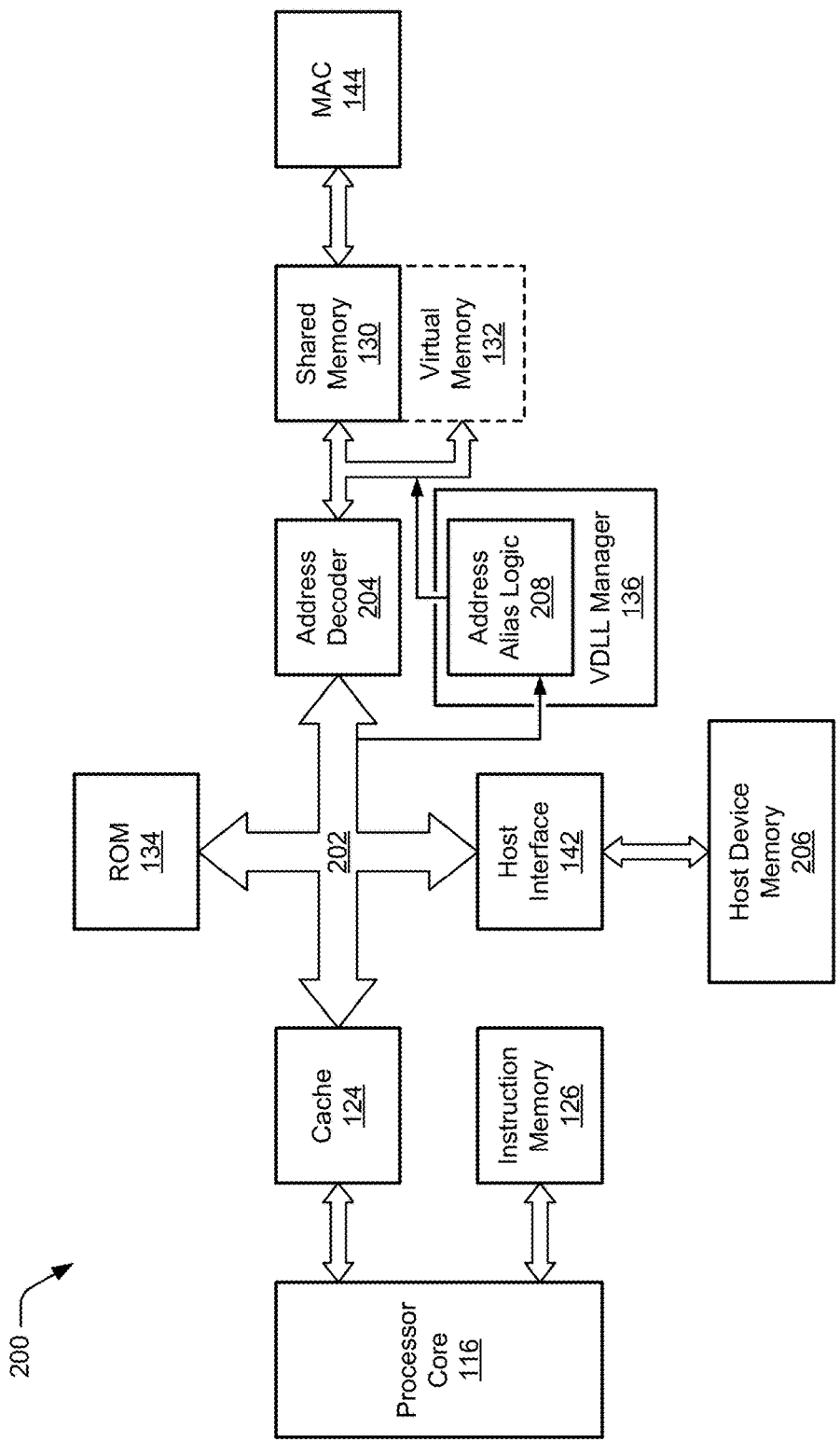
FIG. 2 illustrates an example configuration of component of an embedded system in accordance with one or more aspects.

FIG. 2 illustrates an example configuration of an embedded system in accordance with one or more aspects generally at 200. In this example, the embedded system is configured as a communication controller that includes a MAC 144 for managing communication of data at a link layer. Although not shown, the MAC 144 may be associated with a PHY device, transceiver hardware, and a physical port or antenna to facilitate communication through a physical channel of wired or wireless medium. Alternately or additionally, the embedded system shown at 200 can represent one communication controller or a portion of a multi-network communication controller. For example, components of the embedded system 200 may be implemented for WLAN communication and be combined with additional or similar components (e.g., another processor core and instruction memory) to also support BlueTooth™ communication.

In this example, an interconnect bus 202 provides connectivity between components or blocks of the embedded system 200, including the cache 124, ROM 134, host interface 142, and an address decoder 204 that is coupled to the shared memory 130. The interconnect bus 202 may be implemented as any suitable type of bus or connection fabric, such as an advanced microcontroller bus architecture (AMBA) bus, advanced extensible interface (AXI), advanced high-performance bus (AHB), advanced peripheral bus (APB), and so on. Alternately or additionally, some components or blocks of the embedded system 200 can be configured as interconnect bus masters (e.g., processor core 116) and other components as interconnect bus slaves (e.g., ROM 134 or address decoder 204).

The cache 124 can be coupled between the processor core 116 and the interconnect bus 202 to provide caching for data or code used by the processor core 116. Code or instructions of firmware may be stored to the instruction memory 126, which is also coupled to the processor core 116. In some cases, the cache 124 or instruction memory 126 have a lower latency than other memories of the embedded system 200 that are accessed through the interconnect bus 202. Read-only data or code of firmware can be written or stored by the ROM 134 for access or execution by the processor core 116. For example, the processor core 116 may execute boot ROM code or boot ROM patch code from the ROM 134 to initialize and load firmware of the embedded system 200.

The host interface 142 may enable the embedded system 200 to access to host device memory 206 of a host device or computing device in which the system is implemented. In some cases, firmware of the embedded system 200 is stored in the host device memory 206 and downloaded to memory of the embedded system for execution. For example, executable code and data of a firmware image can be downloaded from the host device memory 206 to the instruction memory 126, ROM 134, and shared memory 130 of the embedded system 200 when initializing or resuming operation of the embedded system.

The address 204 decoder enables the processor core 116 to access the shared memory 130, which is not directly coupled with the processor core. In other words, the address decoder 204 can translate address information of requests received via the interconnect bus to enable access of physical locations of the shared memory 130. The MAC 144 is also coupled to the shared memory 130, which may be used to buffer data communicated through a network interface that is associated with the MAC. For example, the shared memory 130 can be partitioned into a transmit buffer to buffer data queued for transmission and a receive buffer to buffer received through the network interface.

In this example, the embedded system 200 also includes address alias logic 208 associated with the VDLL manager 136. The address alias logic 208 can be configured effective to translate any firmware address, such as a virtual address, to any address in the shared memory. As shown in FIG. 2, the address alias logic 208 may alter or modify address activity of the address decoder 204 to enable re-mapping of addresses in the virtual memory 132 to addresses in the shared memory 130. In other words, the address alias logic 208 enables firmware features with virtual addresses (e.g., virtual memory 132) to be loaded into and executed from any available portions in the shared memory 130. By so doing, firmware features can be dynamically loaded to and executed from any area of the shared memory 130 that is not occupied by other code or data (e.g., transmit and receive data buffers). The implementations and uses of the address alias logic 208 vary, and are described throughout the disclosure.

Figure 3:
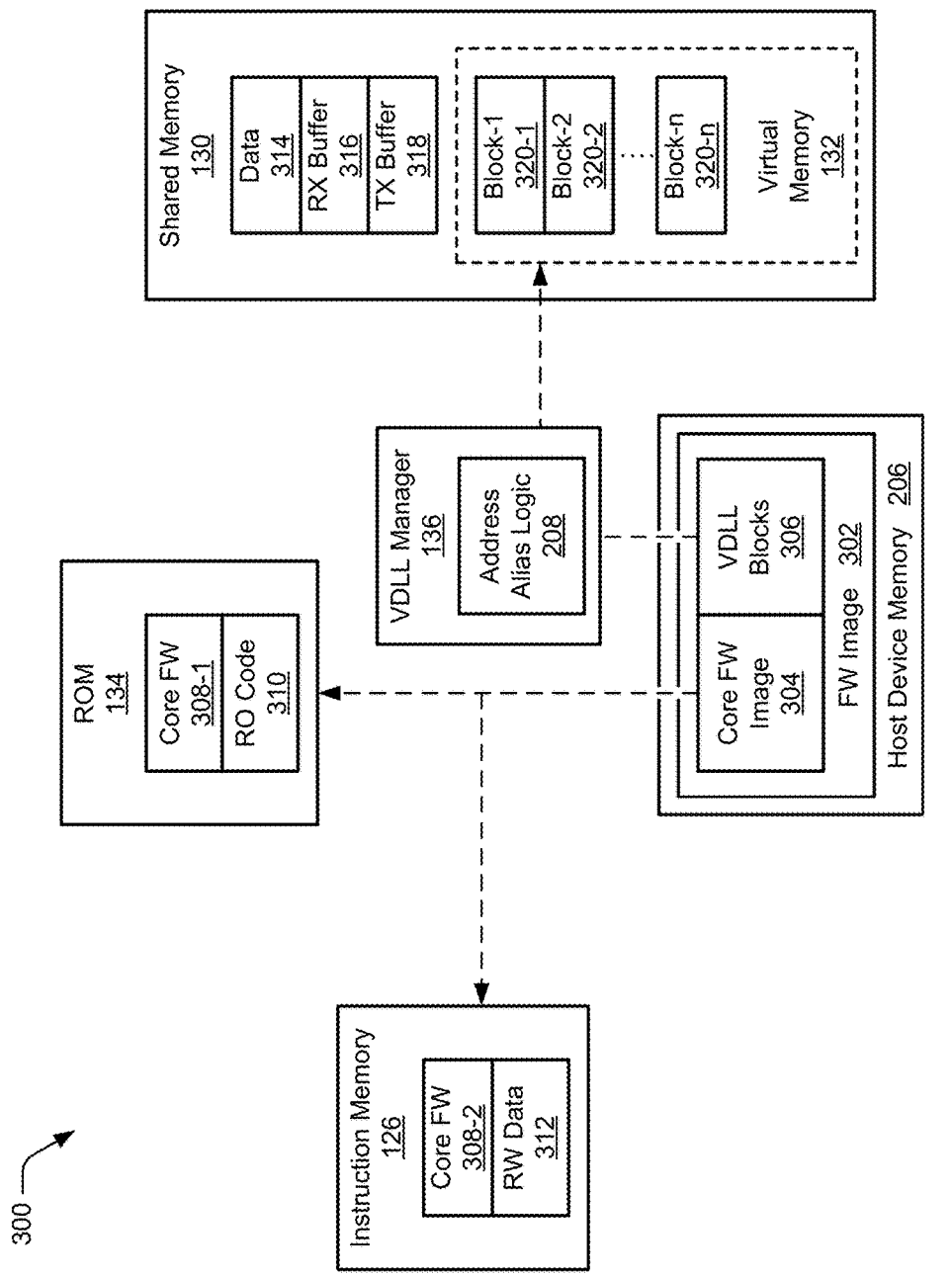
FIG. 3 illustrates example configurations of memory components that are capable of implementing virtual dynamic libraries in embedded systems.

FIG. 3 illustrates example configurations of memory components that are capable of implementing virtual dynamic library loading generally at 300. Although shown as including a host device memory 206, the aspects described herein may be implemented with on-chip memories of an embedded system or other memories external to the embedded system. For example, a firmware image may be stored in an on-chip ROM memory or an off-chip Flash memory coupled to the embedded system via a SPI interface. Alternately or additionally, the firmware image may be partitioned between two or more memories of the embedded system for increased image size or to enable parallel loading of the firmware image.

In this example, a firmware image 302 (FW image 302) is stored by the host device memory 206 that is accessible via the host interface 142 of the embedded system. The FW image 302 may include a core firmware image 304 (core FW image 304) and an image or respective images of virtual dynamic library loading blocks 306 (VDLL blocks 306). The core FW image 304 (or basic FW image) may include code and data configured to implement core or basic functionalities of the embedded system, such as initialization of components, housekeeping functions, data communication functions, core features of a real-time operating system, or the like. Here, the core FW image 304 includes a firth portion of core firmware 308 (core FW 308-1) and read-only code 310 (RO code 310) that are loaded to the ROM 134 of the embedded system. In some cases, the first portion of the core FW 308-1 or RO code 310 includes boot code or boot code patch for booting the embedded system and performing component configuration or initialization.

In some aspects, the core FW image 304 is loaded or copied to the ROM 134, from which code and data are copied to other memories of the embedded system. Alternately, code or data can be copied from the host device memory directly to other memories of the embedded system. Here, assume that the core FW image 304 is copied to the ROM 134 when the embedded system is booted. From the ROM 134, a second portion of core firmware 308-2 (core FW 308-2) can be loaded to the instruction memory 126 for execution by a processor core of the embedded system. In some cases, the second portion of core FW 308-2 includes code for implementing an RTOS and other basic features of the embedded system. Additionally, read-write data 312 (RW data 312) is also loaded to the instruction memory 126 from the ROM 134 for use by the RTOS and other functions of the embedded system.

The firmware (not shown) of the embedded system can also configure or initialize the shared memory 130 for use by functions or features of the embedded system. In some cases, an area of the shared memory is configured to store data 314 of the embedded system, which may include any suitable type of data or variables. When configured to manage communicated data, the shared memory may also include a receive buffer 316 (RX buffer) and a transmit buffer 318 (TX buffer). For example, as part of a data path, the RX buffer 316 can store data received via the MAC 144 and the TX buffer 318 can store other data queued for transmission through the MAC 144. Generally, the embedded system may manage a bi-directional flow of communicated data between the MAC 144 and the host interface 142.

In some aspects, respective sizes of the RX buffer 316 or the TX buffer 318 are dynamically managed depending on an operational mode or flow of data within the embedded system. For example, when receiving a stream of data, the size of the RX buffer 316 may be increased to accommodate the incoming data, and the size of the TX buffer 318 may be reduced due to inactivity. When transmitting large amounts of data, the respective sizes of the RX buffer 316 or the TX buffer 318 may be adjusted conversely, such that a larger TX buffer 318 is allocated to buffer or queue the data for transmission.

Alternately or additionally, allocations for the RX buffer 316 or the TX buffer 318 can be altered based on activity of another communication controller. When implemented as a combination WLAN/BlueTooth™ controller, WLAN communication buffer allocations may be reduced when a Bluetooth™ controller has priority or access to a common physical channel (e.g., antenna) and memory allocation is increased for Bluetooth™ communication buffers. As such, allocations of the shared memory 130 for the RX buffer 316 or the TX buffer 318, as well as other data buffers (e.g., Bluetooth™ data buffers), may vary in size or shift in location during operation of the embedded system.

In addition to the core FW 308, the FW image 302 of the embedded system also includes VDLL blocks 306, which may comprise executable code and/or data of features or functions. In some cases, the VDLL blocks 306 include code for implementing advanced features, optional features, features that are mutually exclusive with other features, or features that are not essential for basic operation of the embedded system. For example, the VDLL blocks 306 may include code for implementing low-power states, wireless channel scanning, test and/or diagnostic modes, coexistence arbitration for multiple types of communication, communication link management, wireless network management, or the like. Each of these features or functions may be implemented using one of the VDLL blocks 306 or through multiple VDLL blocks 306.

Generally, one or more of the VDLL blocks 306 are loaded to idle or allocated areas of the shared memory 130 and accessed through addresses of the virtual memory 132. In other words, the code of the VDLL blocks 306 may be built and linked to addresses in the virtual memory 132, which does not exist physically within the embedded system. Because physical locations in the shared memory 130 may vary in size or location (e.g., due to buffer allocations) when a feature of the VDLL blocks 306 is called, the VDLL manager 136 may allocate a different area of the shared memory 130 each time a VDLL block 306 is loaded. Regardless of location in the shared memory 130, however, the VDLL manager 136 can configure the address alias logic 208 to re-map virtually addressed access commands to the VDLL blocks 306 in the shared memory.

In the context of FIG. 3, the VDLL manager 136 may allocate a portion of the shared memory 130 that is proximate the TX buffer 318. When the communication buffers of the embedded system are not fully utilized, the VDLL manager 136 can also allocate part of either or both the RX buffer 316 and TX buffer 318 as memory for use by the VDLL blocks. Once allocated, the VDLL manager 136 can then load VDLL block-1 320-1, VDLL block-2 320-2, through VDLL block-n 320-n to the allocated portion of the shared memory 130 for use by the embedded system. With the virtual addressing of the VDLL blocks 320-1 through 320-n (shown in virtual memory 132), the VDLL manager 136 configures the address alias logic 208 to translate commands to the allocated portion of the shared memory 130. By so doing, the use of the virtual memory 132 for the VDLL blocks 320-1 through 320-n may be transparent to a processor core of the embedded system. Additionally, the use of the address alias logic 208 may enable virtual addressing into the shared memory 130 without a memory management unit (MMU) and/or an address mapping table associated with a processor core of the embedded system.

In some aspects, the address alias logic 208 is implemented with a set of registers that are configured to map a virtual address of a VDLL feature to a physical address of the VDLL feature in the shared memory 130. By way of example, the address alias logic 208 may be configured with the following registers:

Virtual Address Start Register: virtual_adds start [31:11]
Virtual Address End Register: virtual_addr_end [31:11]
Physical Address Register: physical_addr [20:11]
Offset Mask Register: offset_mask [16:11]
Example Address Alias Logic Registers and Associated Bit-Widths Although shown or described with specific bit-widths or bit offsets, the address alias logic 208 may be implemented with any suitable combination of registers of various bit-widths, masks, or offsets. In this example, the virtual address start register may be configured as a 20-bit register, which enables memory blocks to be allocated in at least 2 kilobyte (KB) size increments. As such, from block to block of code, the address alias logic can alter an upper 20 bites for address translation. Alternately or additionally, this register can be programmed with a virtual address of the firmware feature when the code is compiled and linked. Similarly, the virtual address end register may also be configured as a 20-bit register. This may allow software to attach variable size buffers to a single address alias entry, thereby enabling efficient use of a limited number of virtual address aliases.

The physical address register may link or point to a physical location of the VDLL blocks 320 loaded into the shared memory 130. In some cases, the physical address register is a 10-bit to support variable block sizes. Generally, the physical address register indicates which and/or how many of the address bits should be altered to map access into the shared memory 130. The use of bits [20:11] by the physical address register may enable software to support flexible block sizes that range from 2 KB to 64 KB. When accessing the shared memory 130, upper bits (e.g., upper 12 bits) of an address can be fixed, such that software or firmware of the embedded system does not need to program or alter bits [31:20] of the address.

The address alias logic 208 may also include an offset mask register for indicating a number of bits to alter between a virtual address and a physical address in the shared memory 130. In some cases, the number of bits altered between the virtual address and the physical address vary due to the address alias logic 208 support of variable block sizes. Alternately or additionally, the use of the offset mask register may preclude a need for the address alias logic 208 to calculate block sizes in run time, thereby increasing speed of comparisons or other operations.

Figure 4:
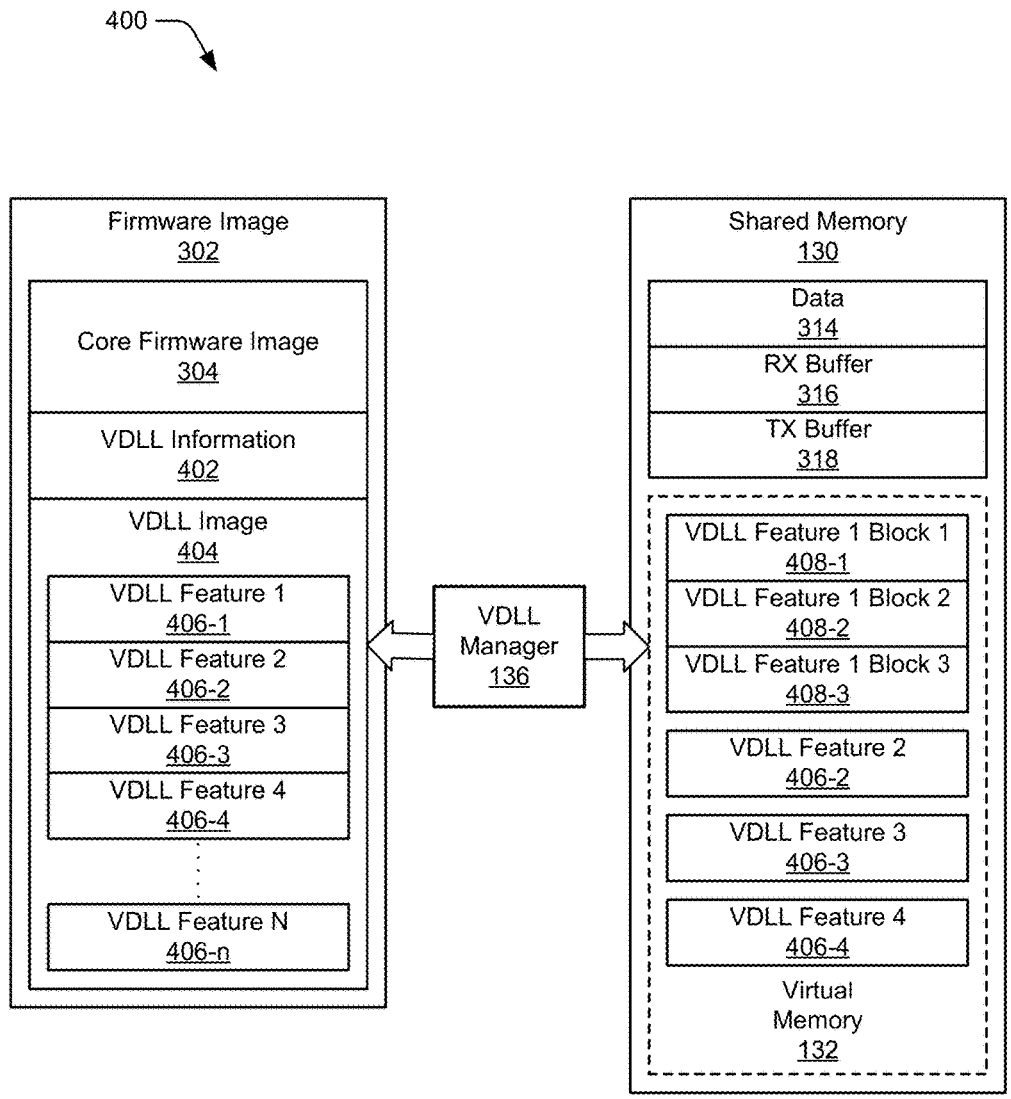
FIG. 4 illustrates example firmware images and virtual dynamic library images in accordance with one or more aspects.

FIG. 4 illustrates example firmware images and virtual dynamic library images in accordance with one of more aspects generally at 400. Generally, the firmware image 302 is stored in memory of a host device or a ROM of the embedded system (e.g., embedded system 114). As described with reference to FIG. 3, the firmware image 302 may include a core firmware image 304 for the embedded system and an image of VDLL blocks that are used to implement various features of an embedded system. In this example, the firmware image 302 includes virtual dynamic library information 402 (VDLL information 402) that describes features provided by VDLL blocks and organization (or structure) of each VDLL block in the firmware image.

In some aspects, the core firmware image 304 and VDLL information 404 are downloaded when the embedded system is booted and initialized for operation. Once the core firmware of the embedded system is operational, the core firmware may use, via the VDLL manager 136, the VDLL information 402 to execute any of the features provided by the VDLL code of the VDLL image. As shown in FIG. 4, the VDLL image includes code and/or data for VDLL feature 1 406-1 through VDLL feature N 406-n, each of which may be dynamically loaded to the shared memory 130 for use by the firmware of the embedded system.

Each of the VDLL features 406 may include or be implemented through one or more blocks of code (e.g., VDLL blocks). In this example, the VDLL manager 136 can implement VDLL feature 1 406-1 by loading three VDLL blocks that include VDLL feature 1 block 1 408-1, VDLL feature 1 block 2 408-2, and VDLL feature 1 block 3 408-3. Alternately, VDLL features may be implemented as a single VDLL block, as illustrated by the VDLL feature 2 406-2, VDLL feature 3 406-3, and VDLL feature 4 406-4 being loaded as single VDLL blocks into the shared memory 130. Although shown with VDLL feature 1 406-1 though VDLL feature 4 406-1 in the shared memory 130, the VDLL manager 136 may allocate portions of the shared memory 130 and/or load any or all of the VDLL features 406 as requested or called by firmware.

Figure 5:
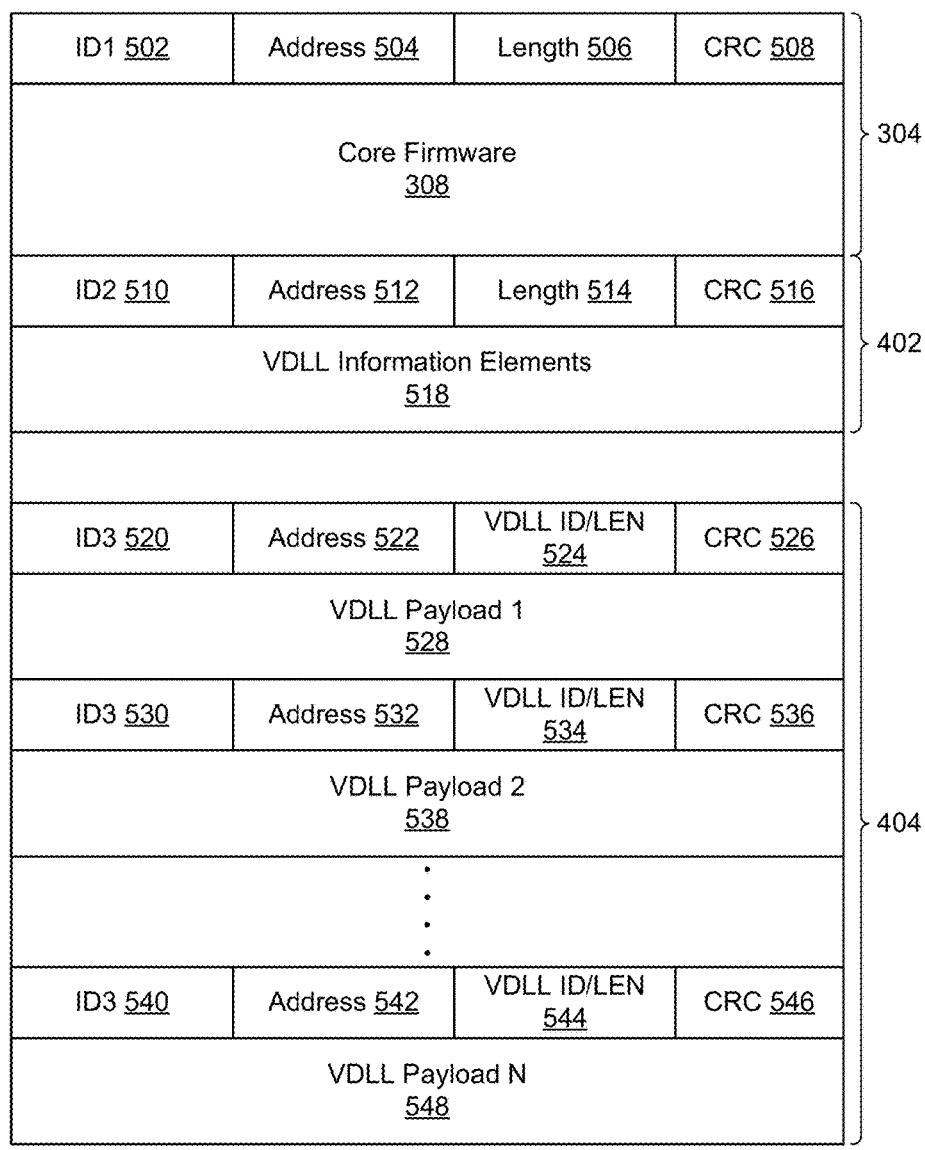
FIG. 5 illustrates an example of a composite firmware image from which aspects of virtual dynamic library loading can be implemented.

As shown in FIG. 5, a firmware image 500 of an embedded system may be structured with respective block headers and payloads for the core firmware 308 and VDLL features 406. The core firmware image 304, which is loaded during initialization, includes a block header with an ID1 502 (e.g., command or identifier), an address 504, length 506, and a cyclic redundancy check value 508 (CRC value 508) for the core firmware 308. In some cases, the core firmware is copied or loaded into a ROM of the embedded system based on the address 504 and length 506 values of the block header of the core firmware image 304. Alternately or additionally, the code and/or data of the core firmware 308 can be verified prior to execution based on the CRC value 508 of the block header.

Virtual dynamic library information 402 of the firmware image 500 may also be loaded when the embedded system is initialized. Generally, the VDLL information 402 describes VDLL features or VDLL blocks that are included in the firmware image 500 or available to the firmware of the embedded system. As shown in FIG. 5, the VDLL information can include a block header of an ID1 510 (e.g., identifier), address 512, length 514, and a CRC value 516 for one or more VDLL information elements. The VDLL information elements may include any suitable type of information that describes the organization of VDLL images, such as an offset of a VDLL image from a beginning of the firmware image for the first element and respective offsets from a beginning of the VDLL image for subsequent VDLL elements. The VDLL information elements 518 can also include an address specifying a start address of a VDLL image, an identification (ID) value for the VDLL, a block length of the VDLL, a number of block in the VDLL, a total length of the VDLL, or the like.

The VDLL image 404 may include code and/or data for multiple VDLLs, each of which may include one or more VDLL blocks. As shown in FIG. 5, a first VDLL includes a block header with an ID3 520, address 522, VDLL ID/Length 524, and CRC value 526 for a first VDLL payload 1 532. In addition to the first VDLL, the VDLL image 404 may include any suitable number of additional VDLLs, such as a second VDLL that includes another block header with an ID3 530, address 532, VDLL ID/Length 534, and CRC value 536 for a second VDLL payload 2 538 through an $N^{th}$ VDLL that includes a block header with an ID3 540 (e.g., identifier), address 542, VDLL ID/Length 544, and CRC value 546 for an $N^{th}$ VDLL payload N 548. The ID field of the VDLLs may be set according to an address range for the VDLLs in the virtual memory 132 (e.g., 0xC). In some cases, the address field specifies a starting address of the VDLL or an offset to a subsequent VDLL from a starting address of the VDLL image 404. For multi-block VDLLs, a sequence bit (e.g., SEQ field) may be set to distinguish a first VDLL block from subsequent VDLL blocks of a same VDLL feature that are downloaded after the first VDLL block. Alternately or additionally, the VDLL ID and length values can be used to identify and download a VDLL from within the VDLL image 404. Each block header can also include a CRC value for validating or verifying a VDLL block before execution or downloading a next VDLL block of a particular VDLL feature.

Techniques for Implementing Virtual Dynamic Library Loading

The following discussion describes techniques for implementing virtual dynamic library loading in embedded systems. These techniques can be implemented using any of the environments and entities described herein, such as the VDLL manager 136, address alias logic 208, VDLL blocks 306, and core firmware 308. These techniques include methods illustrated in FIGS. 6, 8, and 10, each of which is shown as a set of operations performed by one or more entities. These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement dynamic loading or unloading of VDLL blocks to provide various communication features or functions. In portions of the following discussion, reference will be made to operating environment 100 of FIG. 1 and entities of FIGS. 2-5 by way of example. Such reference is not to be taken as limiting described aspects to operating environment 100 but rather as illustrative of one of a variety of examples.

Figure 6:
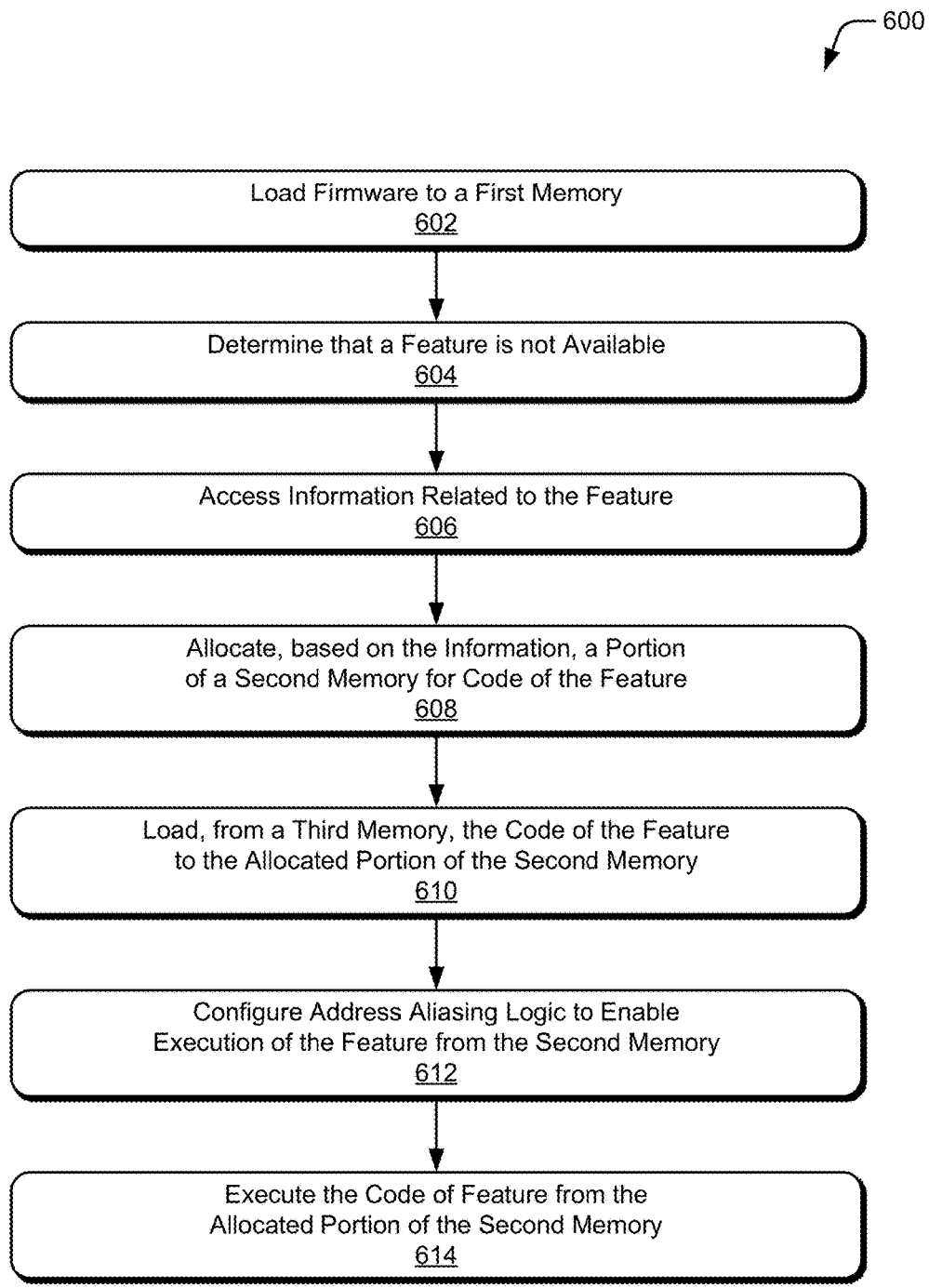
FIG. 6 depicts an example method for implementing dynamic virtual libraries in an embedded system.

FIG. 6 depicts an example method 600 for implementing dynamic virtual libraries in an embedded system, including operations performed by the VDLL manager 136 and/or the address alias logic 208.

At 602, firmware is loaded to a first memory of an embedded system. The embedded system may be implemented as any suitable type of system, such as a system-on-chip, integrated circuit, or communication controller. In some cases, the firmware is a core firmware or basic firmware of the embedded system that is configured to implement core features of the embedded system. Alternately or additionally, the firmware may be loaded or executed as part of a boot or initialization process of the embedded system.

Figure 7:
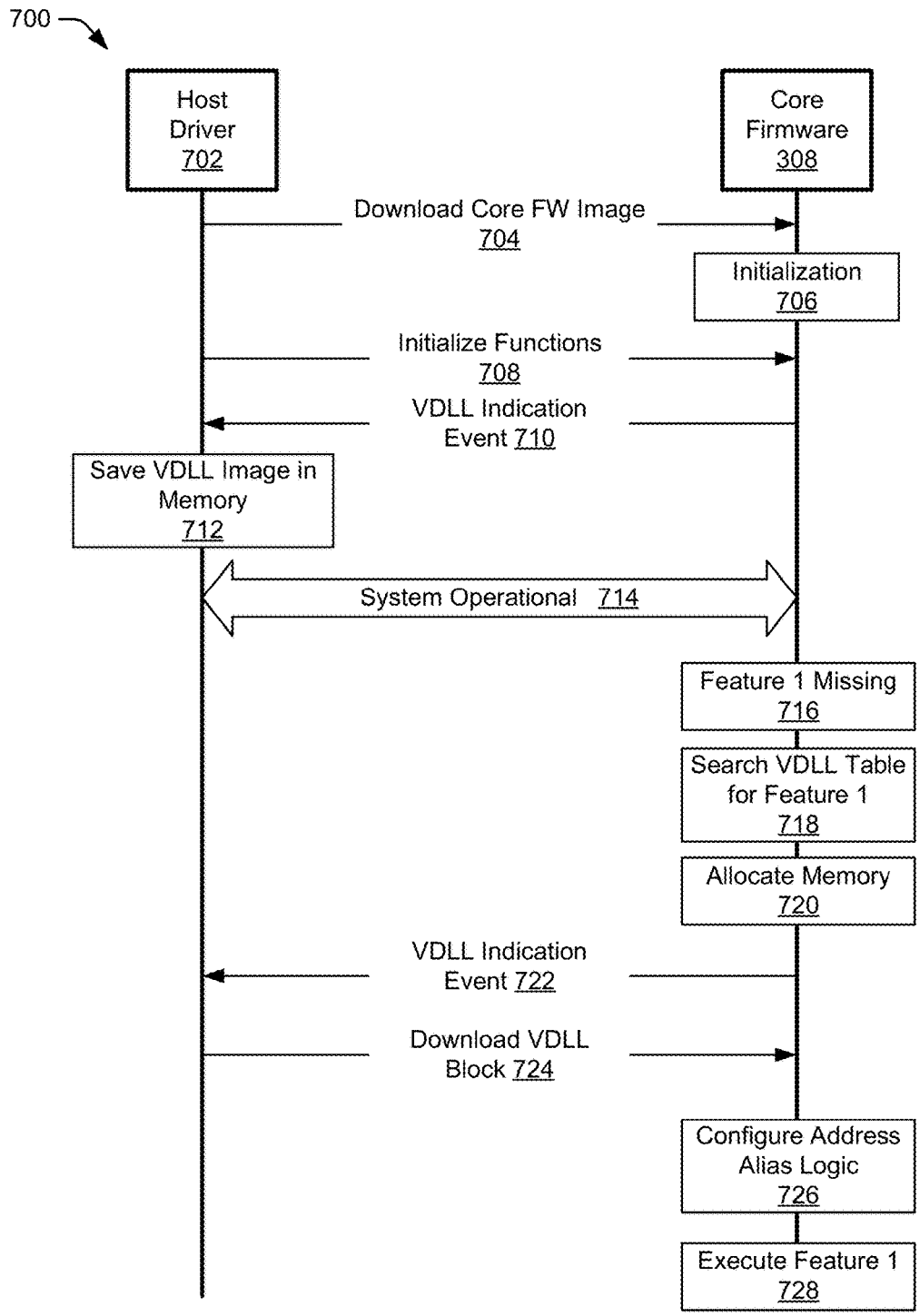
FIG. 7 illustrates an example timeline of operations for implementing a virtual dynamic library in an embedded system.

By way of example, consider FIG. 7 which illustrates an example of timeline 700 of operations for implementing a VDLL in an embedded system. Here, a host driver 702 of a computing device 102 downloads a core FW image at 704 to implement an instance of core firmware 308 on a processor core of an embedded system, which is initialized at

708. After the embedded system is initialized, a command to initialize functions 708 is received from the host driver 702. After parsing VDLL information embedded with the core FW image, a VDLL indication 710 is transmitted to the host driver 702 to indicate an offset to a VDLL image in memory of the host device. Based on the VDLL indication event 710, the host driver 702 saves the VDLL image 712 into memory, and the embedded system is operational at point 714.

At 604, it is determined that a feature is not available in the firmware. This determination may be made in response to receiving a call or request for a particular feature of firmware. For example, WLAN software operating on a host device may call for a feature that is not currently provided by the core firmware of the embedded system, such as a coexistence management function, channel scanning function, low-power state-related function, or the like. In the context of the present example, the core firmware 308 determines that a requested firmware feature 1 is missing at 716.

At 606, information related to the feature is accessed. The information related with the feature may include VDLL information that is downloaded or associated with the core firmware image of the embedded system. In some cases, information related to a set of VDLL features is accessed and/or searched for an identifier of a VDLL block that provides the requested feature. Alternately or additionally, the information related to the feature may be stored in an instruction memory, ROM, or shared memory of the embedded system. Continuing the ongoing example, a VDLL manager 136 of the embedded system searches a VDLL table for feature 1 at 718.

At 608, a portion of a second memory is allocated based on the information associated with the feature. The second memory may be a RAM or shared memory of the embedded system. In some cases, an amount of the second memory is allocated based on a size, length, or amount of code associated with the feature. Alternately or additionally, some of the second memory may be allocated from a communication buffer, such as a transmit buffer or receive buffer of a data path of the embedded system. In the context of the present example, the VDLL manager 136 of the embedded system allocates a portion of the shared memory 130 at 720 for code of the feature 1 that is missing.

At 610, the code of the feature is loaded from a third memory to the allocated portion of the second memory. The third memory may include a memory of a host device or a memory that is external to the embedded system. In some cases, a request for code of the feature is transmitted to a host device effective to initiate a transfer of the code from the host device. Alternately or additionally, the request to the host device may include an identifier of the feature or an offset useful to locate the feature in an image of feature code. Continuing the ongoing example, the core firmware 308 or VDLL manager 136 signals a VDLL indication event 722 to the host driver, which triggers a download of a VDLL block at 724.

At 612, address aliasing logic is configured to enable execution of the code of the feature from the second memory. The address aliasing logic may be programmed with information associated with the feature, such as virtual address information, feature code length, an offset or location information of the allocated shared memory, or the like. Generally, the address aliasing logic is configured to enable the core firmware 308 or other software of the embedded system to transparently access and/or execute the feature from the second memory. In the context of the present example, the VDLL manager 136 configures address alias logic 208 of the embedded system at 726 to enable a processor core 116 of the embedded system to execute the feature from the shared memory 130.

At 614, the code of the feature is executed from the second memory. Alternately or additionally, the second memory for VDLL execution may be cached to a cache memory associated with a processor core to facilitate more responsive execution, then processor needs to invalid cache before execution the code. Concluding the present example, the processor core 116 of the embedded system accesses or executes the code of the VDLL feature from the shared memory 130 at 728 via address translation provided by the address alias logic 208.

Figure 8:
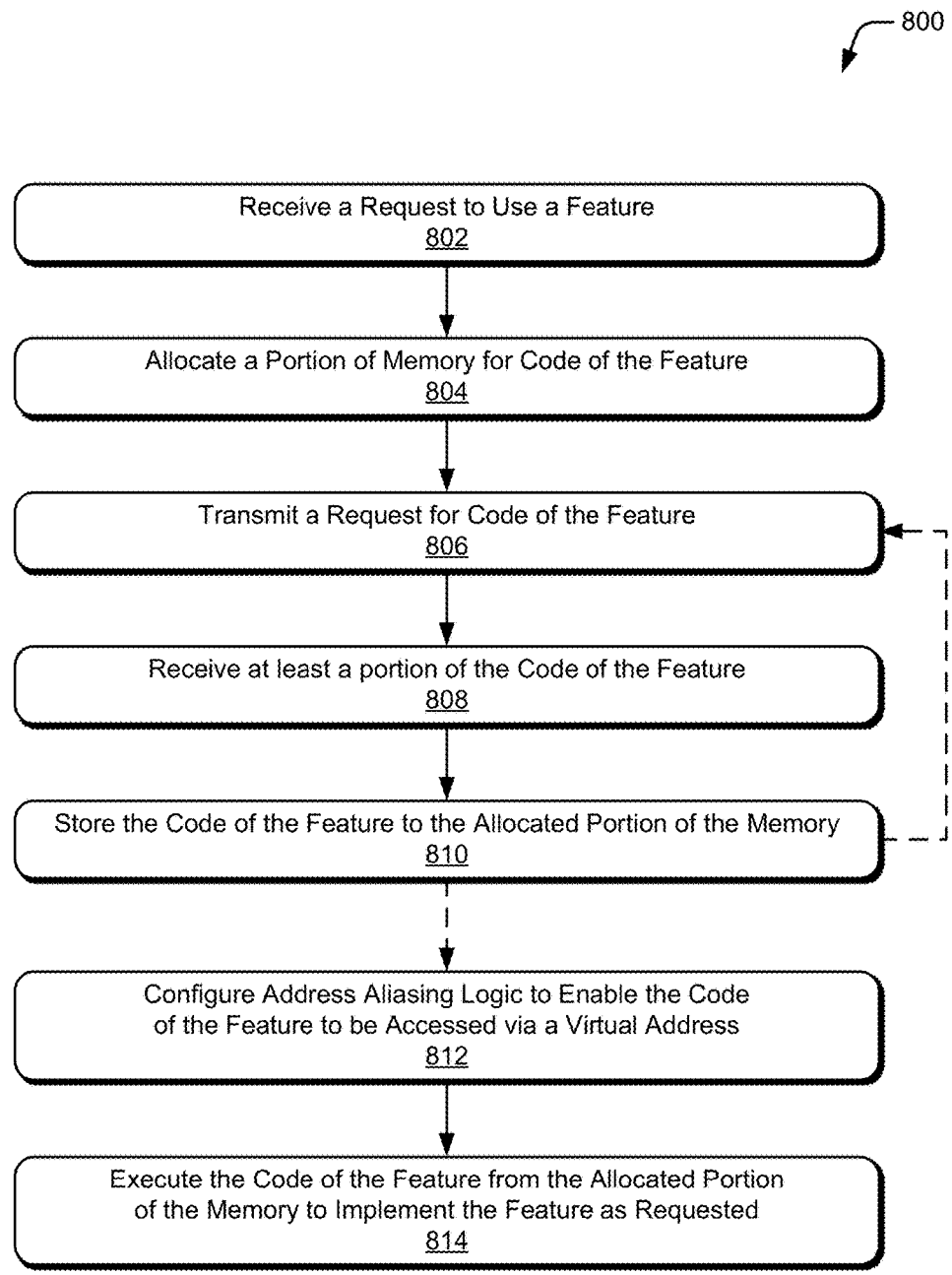
FIG. 8 depicts an example method for loading a feature of a virtual dynamic library in accordance with one or more aspects.

FIG. 8 depicts an example method 800 for loading a feature of a virtual dynamic library to an allocated portion of memory, including operations performed by the VDLL manager 136 and/or the address alias logic 208.

At 802, a request is received to use a feature. The feature can be a VDLL feature that is provided by one of the VDLLS in an embedded system. The request may be received from any suitable source, such as a host device, an application of the host device, a host device driver, software of the embedded system, or the like. In some cases, the request is received by firmware or a VDLL manager of the embedded system. Alternately or additionally, the request may include data or parameters associated with the feature.

Figure 9:
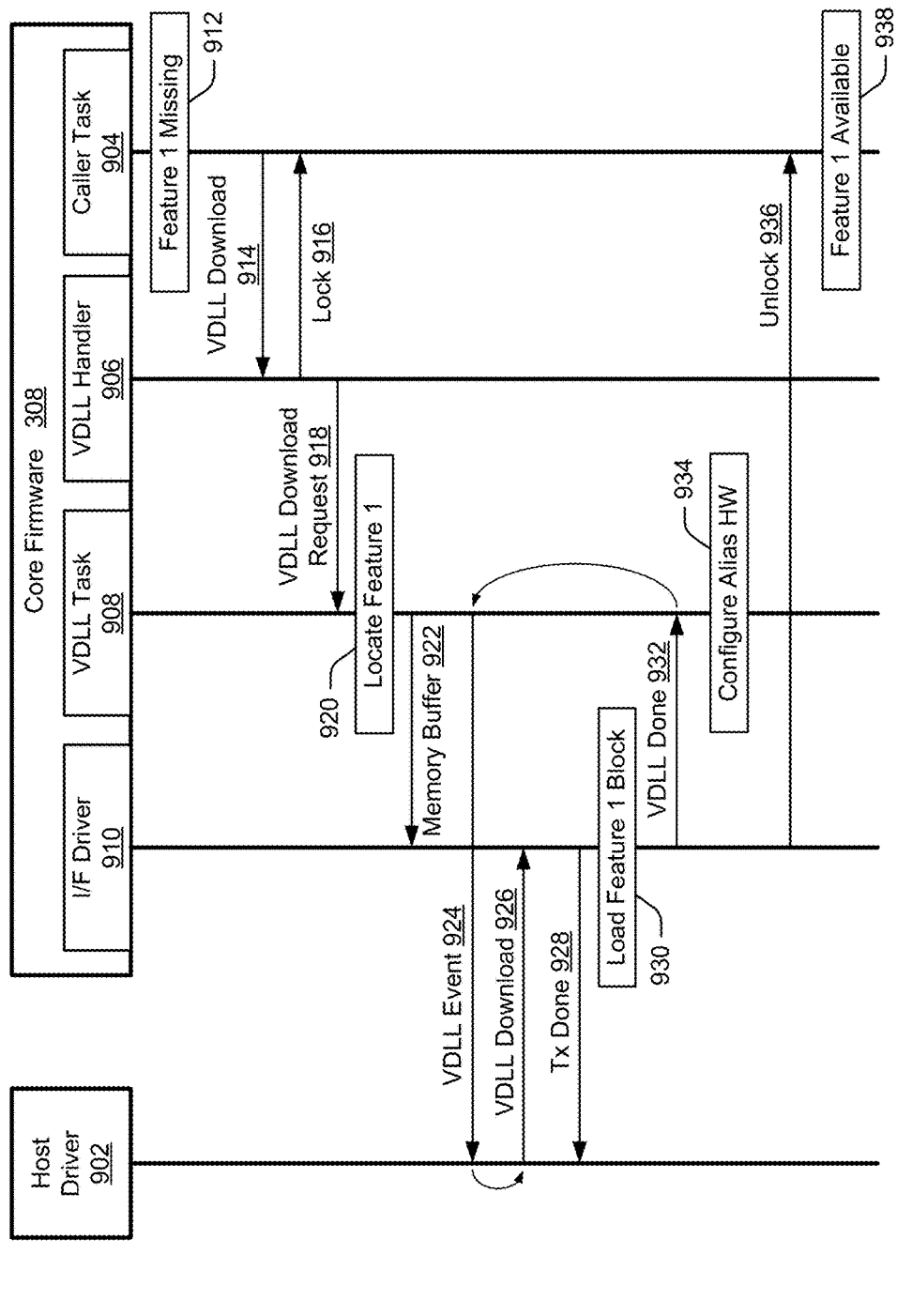
FIG. 9 illustrates an example timeline of operations for loading a feature of a virtual dynamic library in accordance with one or more aspects.

By way of example, consider FIG. 9 which illustrates an example timeline 900 for loading a feature of a VDLL in accordance with one or more aspects. Here, assume that a host driver 902 requests use of a feature 1 from core firmware 308. In this example, VDLL management of the core firmware is implemented through a caller task 904, VDLL handler 906, VDLL task 908, and an interface driver 910 (I/F driver 910). Any or all of these entities may be implemented as part of or through a VDLL manager 136 of the embedded system. In response to the request for the feature 1, the caller task 904 determines that feature 1 is missing from the core firmware 308 and/or currently loaded VDLL features at 912. The caller task 904 then requests a VDLL download 914 to the VDLL handler 906 and locks the call for the feature at 916. Based on a VDLL download request 918 of the VDLL handler 906, the VDLL task 908 can search a VDLL information table or index to locate feature 1 at 920 and information associated with feature 1.

At 804, a portion of memory is allocated for code of the feature. The portion of memory may be allocated from a shared memory that also includes data buffers or other shared memory areas. In some cases, the portion or an amount of the memory is allocated based on a size, length, or amount of code associated with the feature. Alternately or additionally, some or all of the memory may be allocated from a data buffer or memory previously occupied by other code of another feature. In the context of the present example, the VDLL task 908 allocates a portion of the memory and provides an indication of the memory buffer 922 to the I/F driver 910.

At 806, a request for the code of the feature is transmitted. The request for the feature may be transmitted to a host device or driver thereof initiate a download of the code via a host interface. In some cases, the request for the code requests a single block of code of the feature. In other cases, the request for the code can request multiple blocks of code of the feature. Alternately or additionally, the request may include an identifier or location associated with the code effective to enable a host driver to download the code to the embedded system. Continuing the ongoing example, the VDLL task 908 transmits a VDLL event 924 to the host driver 902 for a block of code for the requested feature 1.

At 808, at least a portion of the code of the feature is received. The portion of the code may be received from a host device and/or via a host interface that enables communication between the embedded system and host device. In some cases, the portion of code is received as a VDLL block of code of the VDLL feature. Alternately or additionally, the code of the feature may be partitioned across multiple VDLL blocks of code, which may be downloaded in a predetermined series or sequence. In the context of the present example, the I/F driver 910 receives a VDLL download 926 of a VDLL block from the host driver 902. In some cases, the I/F driver 910 also provides an indication or acknowledgement of completion, such as a transmission done 928 indication.

At 810, the code of the feature is stored to the allocated portion of the memory. The code of the feature may be stored to any suitable allocated portion of memory. Due to the virtual address of the feature, a processor core of the embedded system will be access or execute the code of the feature from any allocation of the memory. From operation 810, the method 800 may proceed to operation 812 or return to operation 806 to transmit another request for another portion of the code of the feature. Continuing the ongoing example, the I/F driver 910 loads the feature 1 block at 930 and provides an indication of "VDLL Done" 932 to the VDLL task 908.

At 812, address aliasing logic is configured to enable the code of the feature to be accessed via a virtual address. The address aliasing logic may be programmed with information associated with the feature, such as virtual address information, feature code length, an offset or location information of the allocated shared memory, or the like. Generally, the address aliasing logic is configured to enable the core firmware 308 or other software of the embedded system to transparently access, via the virtual addressing, and/or execute the feature from the allocated portion of memory. In the context of the present example, the VDLL task 908 configures the address alias logic or hardware at 934 to enable the processor core 116 to execute code of feature 1 from the allocated portion of memory.

At 814, the code of the feature is executed from the allocated portion of the memory to implement the feature as requested. Alternately or additionally, the allocated portion of the memory may be cached to a cache memory associated with a processor core to facilitate more responsive execution, then processor needs to invalid the cache before executing the code. Concluding the present example, the I/F driver 910 unlocks the feature 1 at 936 and the caller task 904 provides an indication that the feature 1 is available to the embedded system at 938.

Figure 10:
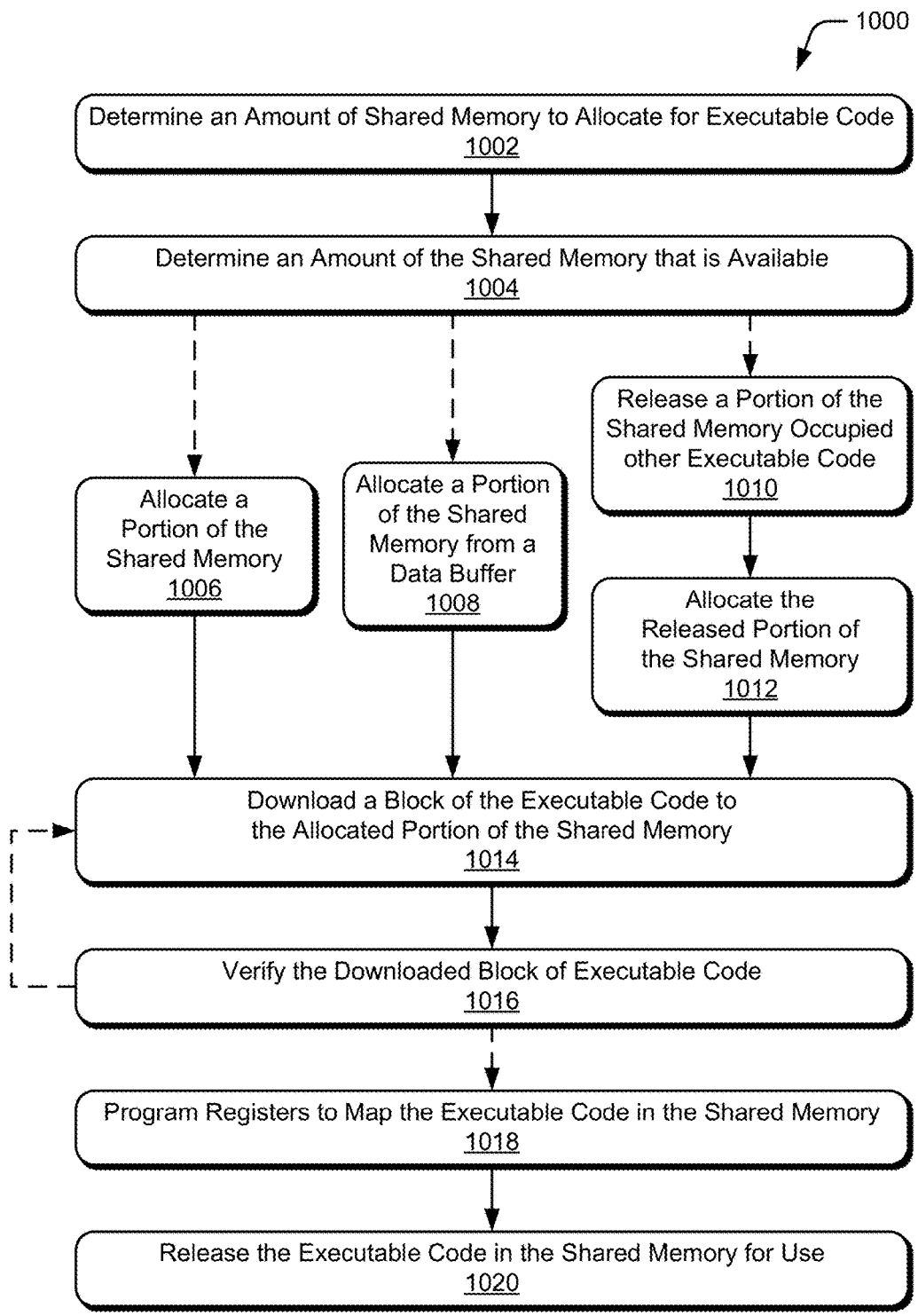
FIG. 10 depicts an example method for allocating shared memory for a block of executable code of a virtual dynamic library.

FIG. 10 depicts an example method 1000 for allocating shared memory for a block of executable code of a virtual dynamic library, including operations performed by the VDLL manager 136.

At 1002, an amount of a shared memory to allocate for executable code is determined. The amount of the shared memory to allocate may be determined based on information of a VDLL feature with which the executable code is associated. In some cases, the determination is made responsive to receiving a call or request for the VDLL feature from a host device or firmware of an embedded system. Alternately or additionally, the amount of shared memory to allocate may be determined based on a length indication or block size indication associated with the executable code.

At 1004, an available amount of the shared memory is determined. The available amount of the shared memory may include memory area or memory space that is not allocated for other uses, such as communication buffers or data variables. In some cases, the amount of shared memory to allocate for executable code is compared with the available amount of shared memory. If a sufficient amount of the shared memory is available for allocation, the method 1000 may proceed to operation 1006. At 1006, a portion of the shared memory is allocated for the executable code of the VDLL feature.

Alternately, if the available amount of shared memory is insufficient to load or store the executable code, the method 1000 may proceed to operation 1008 to allocate shared memory from a data buffer or to operation 1010 to release a portion of the shared memory from other executable code. At 1008, a portion of the shared memory is allocated from at least part of a data buffer, such as a transmit buffer or receive buffer associated with a MAC or other communication component. In some cases, the shared memory may be allocated from a data buffer that is not fully utilized, such that the allocation of the shared memory does not impact performance of the data buffer.

At 1010, a portion of the shared memory is released from other executable code. In some cases, the shared memory is released from code of another firmware feature. For example, responsive to determining that the amount of available shared memory is insufficient to load the executable code of a requested feature, the VDLL manager 136 can unload one or more other previously loaded features from the shared memory to provide space for the current requested feature.

At 1012, the released portion of the shared memory is allocated for the executable code. After releasing some of the shared memory, at least some of the released shared memory can then be allocated for loading of the executable code of a current requested feature. Alternately or additionally, the allocated portion of the shared memory may include a combination of shared memory allocated from available shared memory, shared memory previously occupied by a data buffer, and/or shared memory released from other executable code.

At 1014, a block of the executable code is downloaded to the allocated portion of the shared memory. The block of executable code may also include data or variables associated with a VDLL feature implemented by the executable code. In some cases, the executable code is downloaded from a host device or memory external to the embedded system, such as Flash memory coupled to the embedded system. Alternately or additionally, the block of executable code can be downloaded based on VDLL information that specifies a location, size, or identity of the VDLL feature to which the executable code belongs.

At 1016, the downloaded block of the executable code is verified. The block of executable code may be verified to ensure integrity or authenticity of the executable code. In some cases, the executable code is verified based on a CRC value that is included with the executable code. Once the executable code is verified, the method 1000 may proceed to operation 1018 or return to operation 1014 to download an additional block of executable code, such as for a VDLL feature that includes multiple block of executable code and/or other data.

At 1018, registers are programmed to map the executable code in the shared memory. The registers may comprise address alias registers that enable firmware or software executing on a processor core to access the executable code without altering address information of commands communicated through an interconnect bus. In other works, the programmed registers may enable the firmware or software to transparently access the executable code in the shared memory. In some cases, the registers are programmed with virtual address information of a VDLL feature and physical address information indicated of where the executable code resides in the shared memory.

At 1020, the executable code in the shared memory is released for use. The executable code or VDLL feature with which the executable code is associated is released for use by firmware or software of an embedded system. In some cases, an indication of the release is transmitted to the firmware or software in response to completion of address alias register programming. Once released for use, the firmware or software of the embedded system may initiate execution of the executable code to implement the VDLL feature with which the code is associated.

System-on-Chip

Figure 11:
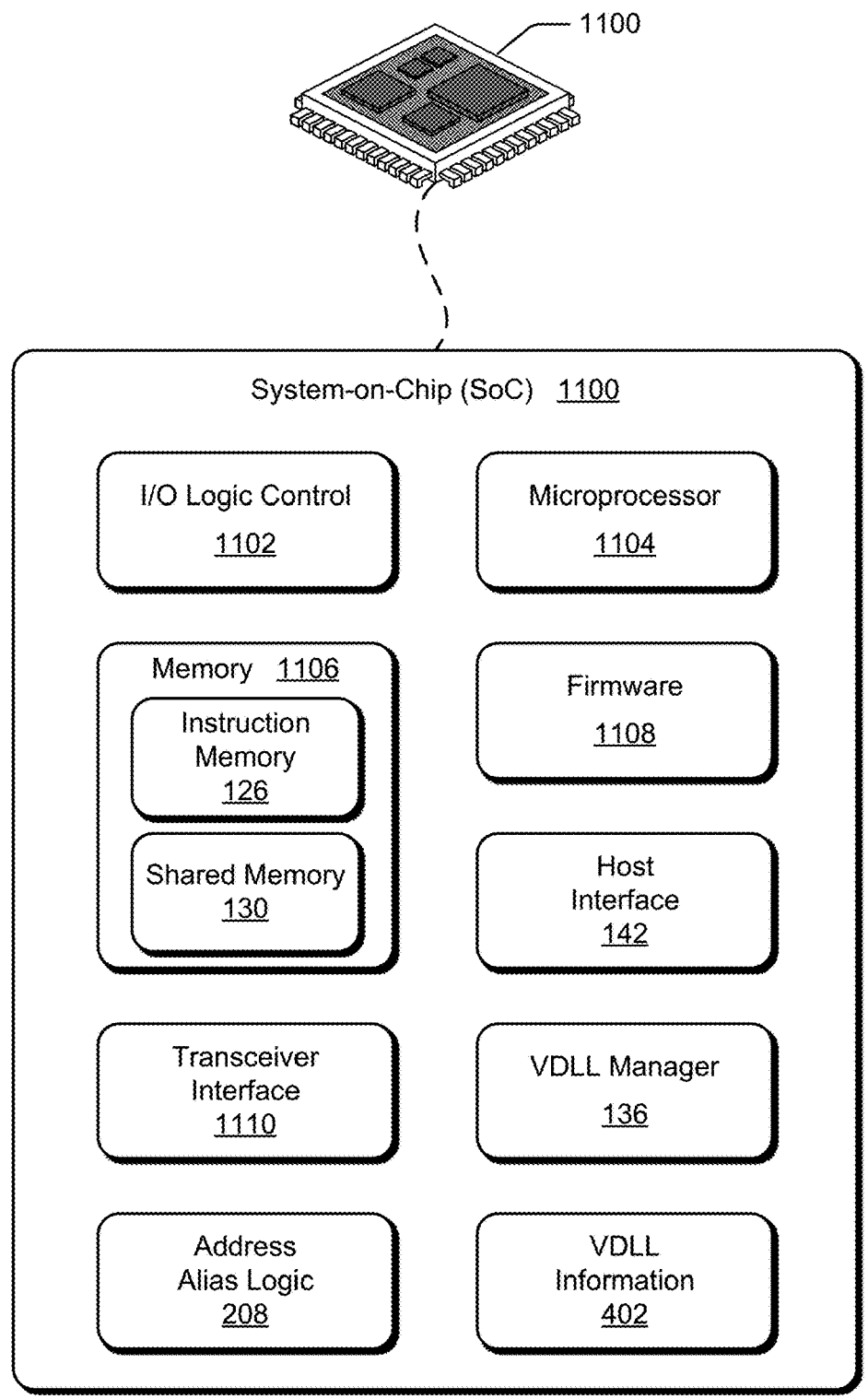
FIG. 11 illustrates an example System-on-Chip (SoC) environment for implementing aspects of virtual dynamic libraries.

FIG. 11 illustrates an exemplary System-on-Chip (SoC) 1100 that can implement various aspects virtual dynamic library loading in embedded systems. The SoC 1100 can be implemented in any suitable device, such as a multimedia plug device, gaming device, set-top box, network-attached storage, wireless router, wireless printer, vehicle-based computing system, smart-phone, netbook, tablet computer, access point, camera, Internet-of-Things (IoT) device, smart appliance, or any other suitable type of device. Although described with reference to a SoC, any or all entities of FIG. 11 may be implemented as an application-specific integrated-circuit (ASIC), processor and/or memory chip set, communications controller, application-specific standard product (ASSP), digital signal processor (DSP), programmable SoC (PSoC), system-in-package (SiP), or field-programmable gate array (FPGA).

The SoC 1100 can be integrated with electronic circuitry, a microprocessor, memory, input-output (I/O) logic control, communication interfaces, other hardware, firmware, and/or software useful to provide functionalities of a device, such as any of the devices listed herein. The SoC 1100 can also include an integrated data bus (e.g., AXI interconnect fabric) that couples various components or blocks of the SoC for the communication of data or commands. The integrated data bus or other components of the SoC 1100 may be exposed or accessed through an external port, such as a JTAG port or other off-chip interface. For example, components the SoC 1100 may be configured or programmed (e.g., flashed) through the external port at different stages of manufacture, provisioning, or deployment.

In this example, the SoC 1100 includes various components such as input-output (I/O) logic control 1102 (e.g., to include electronic circuitry) and a microprocessor 1104 (e.g., any of a microcontroller, processor core, application processor, or DSP). The SoC 1100 also includes memory 1106, which can be any type and/or combination of RAM, SRAM, DRAM, non-volatile memory, ROM, one-time programmable (OTP) memory, multiple-time programmable (MTP) memory, Flash memory, and/or other suitable electronic data storage. In this example, the memory 1106 includes an instruction memory 126 and shared memory 130, which may be implemented as described with reference to FIGS. 1-5. In the context of this disclosure, the memory 1106 stores data, instructions, or other information via non-transitory signals, and does not include carrier waves or other transitory signals.

The SoC 1100 may also include various applications, operating systems, software, and/or firmware (e.g., features and functions), which can be embodied as processor-executable instructions maintained by the memory 1106 and executed by the microprocessor 1104. In this example, the SoC 1100 includes firmware 1108 that may be implemented as a basic firmware or core firmware for managing the functionalities of the SoC. The SoC 1100 also includes a host interface 140 to enable communication with a host device or a driver implemented thereon. In some cases, firmware images or other data of the SoC 1100 are stored in a memory of the host device and accessible via the host interface 140. In such cases, the SoC 1100 can download firmware 1108 (e.g., an RTOS) or other code from the memory of the host device to the memory 1106 of the SoC for execution by the microprocessor 1104.

When implemented to control communication, the SoC 1100 may also include a transceiver interface 1110 to manage or access components configured to enable wired or wireless communication. For example, the SoC 1100 may use the transceiver interface 1110 to control or access components of a local or off-chip wireless transceiver. In some cases, the SoC 1100 may include separate respective interfaces to communicate with a transmitter component and a receiver component of a device in which the SoC 1100 is implemented. Alternately or additionally, the SoC 1100 may be implemented with an interface to control or access components configured to implement other functions, such as data storage, media streaming, content printing, content imaging, wireless network administration, or the like.

The SoC 1100 also includes a VDLL manager 136, address alias logic 208, and VDLL information 402, which may be embodied as disparate or combined components, as described in relation to aspects presented herein. Examples of these components and/or entities, along with their corresponding functionality, are described with reference to the respective components of the environment 100 shown in FIG. 1 and example configurations or entities shown in FIGS. 2-5. The VDLL manager 136 and address alias logic 208 can be implemented, either in whole or part, as processor-executable instructions maintained by the memory 1106 and executed by the microprocessor 1104 to implement various aspects and/or features described throughout the disclosure.

The VDLL manager 136, either independently or in combination with other entities, can be implemented with any suitable combination of components or circuitry to implement aspects described herein. For example, the VDLL manager 136 or address alias logic 208 may be implemented as part of a digital signal processor, memory port logic, address decoding logic, interconnect fabric endpoint, or the like. The VDLL manager 136 may also be provided integral with other entities of SoC 1100, such as integrated with the microprocessor 1104, memory 1106, alias address alias logic 208, address decode logic, or interconnect bus within the SoC 1100. Alternately or additionally, the VDLL manager 136 and other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method comprising:
   determining that a feature is not available in firmware executed by a processor from a first memory, the first memory being a first memory of a system-on-chip;
   accessing, via the firmware, information associated with the feature;
   allocating, based on the information, a portion of a second memory for code of the feature, the second memory being a second memory of the system-on-chip;
   loading, from a third memory, the code of the feature to the allocated portion of the second memory;
   configuring, via the firmware, address aliasing logic to enable execution of the code of the feature from the second memory; and
   executing, via the processor, the code of the feature from the second memory to implement the feature.

2. The method as recited in claim 1, further comprising loading the firmware to the first memory from the third memory prior to execution of the firmware.

3. The method as recited in claim 1, wherein configuring address aliasing logic comprises configuring registers of the address aliasing logic with virtual address information associated with the allocated portion of the second memory.

4. The method as recited in claim 1, wherein allocating the portion of the second memory comprises allocating at least part of a communication data buffer implemented in the second memory for the code of the feature.

5. The method as recited in claim 1, further comprising releasing, prior to allocating the portion of the second memory, at least part of the portion of the second memory from other code of another feature.

6. The method as recited in claim 1, wherein the third memory is a memory of a host device and the loading of the code comprises:
   transmitting, via a host interface and based on the information, a request to the host device for the code of the feature;
   receiving, from the host device via the host interface, the code of the feature; and
   storing the code of the feature to the allocated portion of the second memory.

7. The method as recited in claim 1, wherein loading the code of the feature loads a first block of code of the feature and the method further comprises:
   verifying the first block of code based on a cyclic redundancy check value; and
   responsive to successful verification of the first block of code, loading a second block of code of the feature or releasing the first block of code for execution by the processor.

8. A system-on-chip comprising:
   a medium access control (MAC) unit of a communication interface;
   a host interface;
   a processor;
   a first memory coupled to the processor;
   a second memory coupled between the MAC unit and address logic;
   an interconnect bus coupled between the processor, the address logic, and the host interface; and
   a virtual dynamic library loading (VDLL) manager configured to:
      determine when a feature is not available in firmware executed from the first memory by the processor;
      access, in the first memory, information associated with the feature;
      allocate, based on the information, a portion of the second memory for code of the feature;
      load, from the host interface, the code of the feature to the allocated portion of the second memory;
      configure the address logic to enable execution of the code of the feature from the second memory; and
      cause the processor to execute the code of the feature from the second memory to implement the feature.

9. The system-on-chip as recited in claim 8, further comprising a third memory that is configured as a cache memory and coupled between the processor and the interconnect bus.

10. The system-on-chip as recited in claim 8, wherein
    the address logic comprises address alias logic that includes address translation registers; and
    the VDLL manager is further configured to program address translation registers of the address alias logic effective to enable the processor to execute, from the second memory, the code of the feature through virtual addressing.

11. The system-on-chip as recited in claim 8, wherein:
    the second memory includes a data buffer associated with the MAC unit; and
    the VDLL manager is further configured to allocate the portion of the second memory from at least part of the data buffer associated with the MAC unit.

12. The system-on-chip as recited in claim 8, wherein:
    the first memory is configured as a volatile instruction memory that is coupled directly with the processor; and
    the second memory is configured as a volatile shared memory that is coupled between the address logic and the MAC unit.

13. The system-on-chip as recited in claim 8, wherein:
    the system-on-chip does not include a memory management unit coupled with the processor;
    the firmware executed by the processor comprises a real-time operating system; and
    the processor is not capable of implementing memory paging or virtual memory addressing.

14. The system-on-chip as recited in claim 8, wherein the host interface comprises a universal serial bus interface, a peripheral component interconnect express interface, or a secure digital input output interface.

15. The system-on-chip as recited in claim 8, wherein the interconnect bus that couples the processor, the host interface, and the address logic is implemented in accordance with an advanced microcontroller bus architecture specification.

16. The system-on-chip as recited in claim 8, wherein the system-on-chip is embodied in whole or part as a network interface controller, a wireless network interface controller, a wired network interface controller, a network-enabled storage controller, a network-enabled print controller, or a network-enabled media device.

17. An apparatus comprising:
    a non-volatile memory storing firmware;
    a network interface controller comprising:
       a media access control (MAC) unit;
       a host interface;
       a processor;
       a first memory coupled to the processor;
       a second memory coupled between the MAC unit and address logic;
       an interconnect bus coupled between the processor, the address logic, and the host interface; and a virtual dynamic library loading (VDLL) manager configured to:
   determine when a feature is not available in firmware executed from the first memory by the processor;
   access, in the first memory, information associated with the feature;
   allocate, based on the information, a portion of the second memory for code of the feature;
   load, via the host interface and from the non-volatile memory of the apparatus, the code of the feature to the allocated portion of the second memory; and
   configure the address logic to enable execution, by the processor, of the code of the feature from the second memory to implement the feature.

18. The apparatus as recited in claim 17, wherein:
the firmware stored on the non-volatile memory of the apparatus is a firmware image;
the code of the feature is stored as blocks of code in the firmware image; and
to load the cod of the feature the VDLL manager is further configured to:
   request, based on the information and via the host interface, a driver executing on the apparatus for one or more block of code associated with the feature;
   receive, via the host interface, the one or more block of code associated with the feature; and
   store, to the allocated portion of the second memory, the one or more block of code associated with the feature.

19. The apparatus as recited in claim 18, wherein the firmware executed from the first memory by the processor is a core firmware loaded from the non-volatile memory of the apparatus.

20. The apparatus as recited in claim 17, wherein the apparatus is configured as a multimedia plug device, a gaming device, a set-top box, a network-attached-storage device, a wireless router, a wireless printer, or a vehicle-based computing system.

* * * * *